(12) United States Patent
Huang

(10) Patent No.: US 11,907,649 B2
(45) Date of Patent: Feb. 20, 2024

(54) METHOD AND APPARATUS FOR MANAGING INTERFACE, DEVICE AND READABLE STORAGE MEDIUM

(71) Applicant: TENCENT TECHNOLOGY (SHENZHEN) COMPANY LIMITED, Guangdong (CN)

(72) Inventor: Huihuang Huang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 18/192,920

(22) Filed: Mar. 30, 2023

(65) Prior Publication Data
US 2023/0237253 A1     Jul. 27, 2023

Related U.S. Application Data

(63) Continuation of application No. PCT/CN2022/097993, filed on Jun. 10, 2022.

(30) Foreign Application Priority Data

Jun. 30, 2021 (CN) .......................... 202110739621.1

(51) Int. Cl.
G06F 17/00 (2019.01)
G06F 40/166 (2020.01)
(Continued)

(52) U.S. Cl.
CPC ............ *G06F 40/166* (2020.01); *G06F 40/47* (2020.01); *G06V 10/75* (2022.01); *G06V 20/62* (2022.01)

(58) Field of Classification Search
CPC ........ G06F 40/166; G06F 40/47; G06F 40/58; G06F 9/451; G06V 10/75; G06V 20/62; G06V 30/10
See application file for complete search history.

(56) References Cited

U.S. PATENT DOCUMENTS

| 2006/0130006 A1* | 6/2006 | Chitale ................. | G06F 40/263 |
| | | | 717/136 |
| 2008/0233980 A1* | 9/2008 | Englund ................. | G06V 10/10 |
| | | | 704/E13.011 |

(Continued)

FOREIGN PATENT DOCUMENTS

| CN | 107273366 A | 10/2017 |
| CN | 111309207 A | 6/2020 |

(Continued)

OTHER PUBLICATIONS

International Search Report of PCT/CN2022/097993 dated Aug. 23, 2022 [PCT/ISA/210].

(Continued)

*Primary Examiner* — Laurie A Ries
(74) *Attorney, Agent, or Firm* — Sughrue Mion, PLLC

(57) ABSTRACT

A method and apparatus for managing an interface, a device and a non-transitory computer readable storage medium. The method includes: acquiring a first interface image of a target application, determining a first text contained in the first interface image, the first text being a text in a first language corresponding to the target application, acquiring a second text obtained by translating the first text, the second text being a text in a second language, and replacing the first text in the first interface image with the second text to obtain a second interface image, and displaying, based on the target application, the second interface image.

20 Claims, 10 Drawing Sheets

(51) Int. Cl.
　　　*G06F 40/47*　　　(2020.01)
　　　*G06V 10/75*　　　(2022.01)
　　　*G06V 20/62*　　　(2022.01)

(56) References Cited

U.S. PATENT DOCUMENTS

| | | | |
|---|---|---|---|
| 2014/0081620 A1* | 3/2014 | Solntseva | G06F 40/58 |
| | | | 704/3 |
| 2015/0310291 A1* | 10/2015 | Cuthbert | G06V 30/142 |
| | | | 382/182 |
| 2017/0249301 A1* | 8/2017 | Otsuka | G06F 40/58 |
| 2019/0065476 A1* | 2/2019 | Kwon | G06V 20/62 |
| 2019/0164002 A1* | 5/2019 | Choi | G06F 40/58 |
| 2019/0188004 A1* | 6/2019 | Wisgo | G06F 40/45 |
| 2019/0266432 A1* | 8/2019 | Lee | G06F 40/58 |
| 2020/0393941 A1* | 12/2020 | Liu | G06F 40/109 |
| 2021/0209400 A1* | 7/2021 | Lee | G06V 30/153 |
| 2021/0303905 A1* | 9/2021 | Baek | G06T 7/90 |

FOREIGN PATENT DOCUMENTS

| | | | | |
|---|---|---|---|---|
| CN | 111708959 A | * | 9/2020 | ........... G06F 16/957 |
| CN | 112100063 A | | 12/2020 | |

OTHER PUBLICATIONS

Written Opinion of PCT/CN2022/097993 dated Aug. 23, 2022 [PCT/ISA/237].

\* cited by examiner

METHOD AND APPARATUS FOR MANAGING INTERFACE, DEVICE AND READABLE STORAGE MEDIUM

CROSS-REFERENCE TO RELATED APPLICATION(S)

This application is a continuation application of International Application No. PCT/CN2022/097993 filed Jun. 10, 2022, which claims priority to Chinese Patent Application No. 202110739621.1, filed with the Chinese Patent Office on Jun. 30, 2021, the disclosures of which are incorporated herein by reference in their entireties.

FIELD

Embodiments of the disclosure relate to the field of Internet technologies, and in particular to a method and apparatus for managing an interface, a device and a computer-readable storage medium.

BACKGROUND

With the development of Internet technologies and the popularization of terminal devices, applications are becoming more and more widely used. Usually, one application corresponds to one original language and a user may not be familiar with the original language corresponding to the target application when using the target application.

In the related art, the text in the target application is translated by using a translation application. Specifically, when the text in the target application cannot be copied or the text in the target application is scattered, the user needs to manually input the text in the target application into the translation application.

It is time-consuming for the user to manually input the text in the translation application. Moreover, since the text in the target language is displayed by the translation application, the terminal device needs to display the interface of the target application and the interface of the translation application at the same time; or the user needs to switch between the interface of the target application and the interface of the translation application.

SUMMARY

Embodiments of the disclosure provide a method and apparatus for managing an interface, a device and a readable storage medium, which can be used for solving the problems of low efficiency of viewing translation results and low efficiency of human-computer interaction.

Some embodiments of the disclosure provide a method for managing an interface, performed by an electronic device. The method includes:

acquiring a first interface image of a target application;

determining a first text contained in the first interface image, the first text being a text in a first language corresponding to the target application;

acquiring a second text obtained by translating the first text, the second text being a text in a second language; and replacing the first text in the first interface image with the second text to obtain a second interface image, and displaying, based on the target application, the second interface image.

Some embodiments the disclosure provide an apparatus for managing an interface. The apparatus includes:

at least one memory configured to store program code; and at least one processor configured to read the program code and operation as instructed by the program code, the program code including:

acquisition code configured to cause the at least one processor to acquire a first interface image of a target application;

determination code configured to cause the at least one processor to determine a first text contained in the first interface image, the first text being a text in a first language corresponding to the target application;

the acquisition code being further configured to cause the at least one processor to acquire a second text obtained by translating the first text, the second text being a text in a second language; and replacement code configured to cause the at least one processor to replace the first text in the first interface image with the second text to obtain a second interface image, and display, based on the target application, the second interface image.

Some embodiments of the disclosure provide an electronic device. The electronic device includes a processor and a memory. The memory stores at least one program code. The at least one program code is loaded and executed by the processor to cause the electronic device to implement the method for managing an interface according to any one of the above.

Some embodiments provide a non-transitory computer-readable storage medium storing computer code that when executed by at least one processor causes the at least one processor to implement the method for managing an interface according to embodiments of the disclosure.

Some embodiments further provide a computer program or a computer program product. The computer program or the computer program product stores at least one program code. The at least one program code is loaded and executed by a processor to cause a computer to implement the method for managing an interface according to embodiments of the disclosure.

BRIEF DESCRIPTION OF THE DRAWINGS

To describe the technical solutions of some embodiments of this disclosure more clearly, the following briefly introduces the accompanying drawings for describing some embodiments. The accompanying drawings in the following description show only some embodiments of the disclosure, and a person of ordinary skill in the art may still derive other drawings from these accompanying drawings without creative efforts. In addition, one of ordinary skill would understand that aspects of some embodiments may be combined together or implemented alone.

DETAILED DESCRIPTION

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure.

In the following descriptions, related "some embodiments" describe a subset of all possible embodiments. However, it may be understood that the "some embodiments" may be the same subset or different subsets of all the possible embodiments, and may be combined with each other without conflict.

"Plurality of" mentioned herein means two or more. "And/or" describes an association relationship of associated objects and represents that three relationships may exist. For example, A and/or B may represent the following three cases: Only A exists, both A and B exist, and only B exists. The character "/" in this specification generally indicates an "or" relationship between the associated objects.

Figure 1:
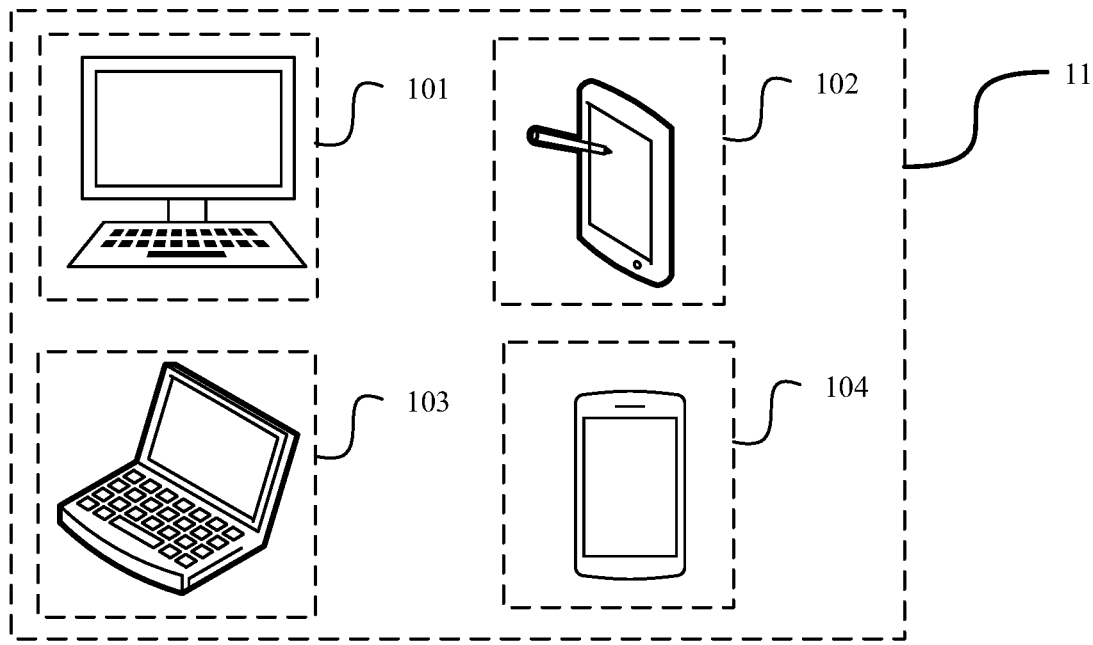
FIG. 1 is a schematic diagram of an implementation environment of a method for managing an interface according to some embodiments.

FIG. 1 is a schematic diagram of an implementation environment of a method for managing an interface according to some embodiments. As shown in FIG. 1, the implementation environment includes an electronic device 11. The method for managing an interface in some embodiments may be executed by the electronic device 11. In some embodiments, the electronic device 11 may include a terminal device. The terminal device may be at least one of a desktop computer 101, a tablet computer 102, a laptop computer 103, a smart phone 104 and a game console.

When a user uses any application running in any terminal device, if the text displayed on an application interface is in a foreign language, it is necessary to translate the text. For example, if the terminal device is a smart phone and the application is a game on the mobile phone, the user needs to translate the foreign language on each interface into their native language before they can continue the game in the current interface. Due to the richness of game pictures, the users need to translate texts frequently.

The need for frequent translations makes the translation based on screenshots in the related art highly complex in operation and costly in time. In another manner, when the user manually copies the foreign language and inputs it into a third-party translation tool, the pronunciation and word formation structure of the foreign language are unfamiliar to the user, making it difficult for the user to input it into the translation tool and, therefore, unable to make use of the translation tool. Moreover, as some foreign languages appear in the game's animation, this dynamic display has high requirements for real-time translation, and the manner of the screenshot or input to the translation tool is poor in real time performance. Therefore, the foreign language cannot be translated in real time, and the translation result cannot be displayed in real time.

According to the method for managing an interface of the embodiments of the disclosure, for the scenario of real-time translation of games with lots of dynamic pages, the text to be translated in the interface image can be automatically determined, and the translated text can be automatically acquired and displayed, so that the text region is quickly extracted and automatically machine-translated. Further, the translation result is rendered in the original screen, thereby improving the efficiency of translating foreign languages in the interface by the application.

Data involved in the method for managing an interface according to some embodiments can be implemented based on cloud technology, data processing/data calculation involved in some embodiments can be implemented based on cloud computing, and data involved can be saved in the blockchain.

Figure 2:
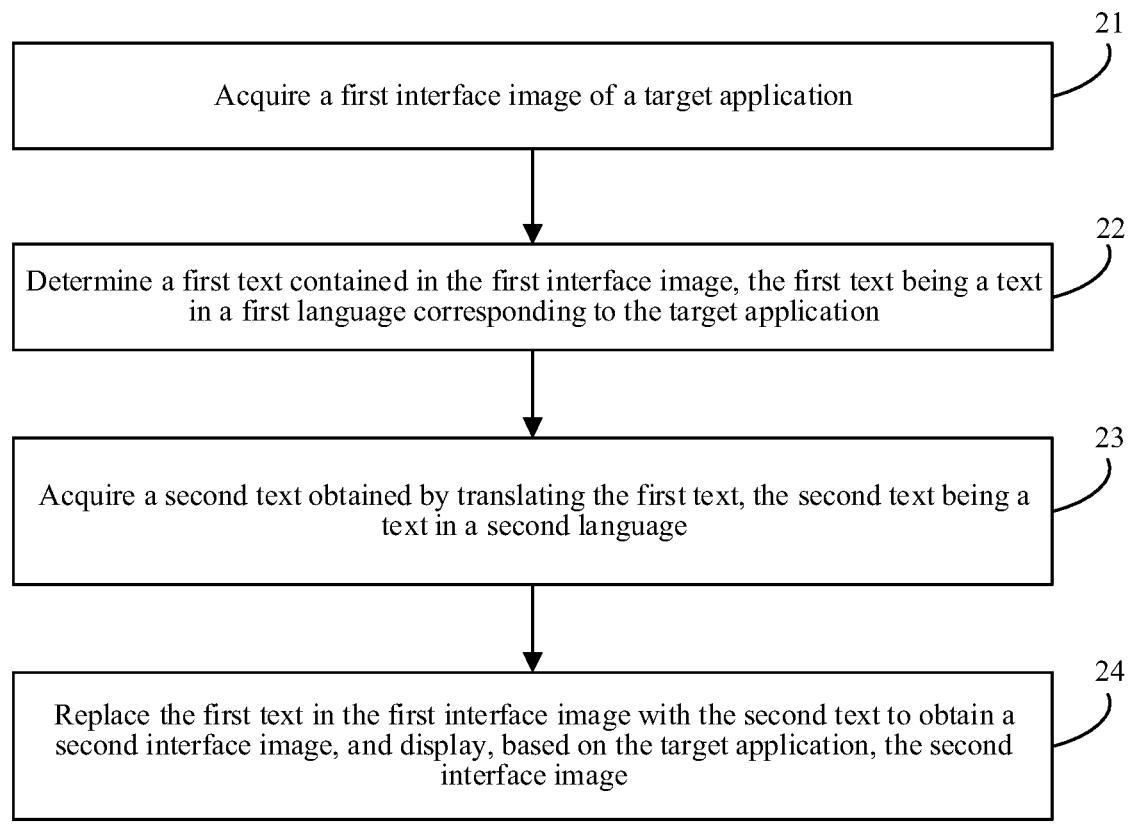
FIG. 2 is a flowchart of a method for managing an interface according to some embodiments.

Based on the above implementation environment, some embodiments of the disclosure provide a method for managing an interface. In an example of a flowchart of a method for managing an interface according to some embodiments shown in FIG. 2, the method may be performed by the electronic device 11 in FIG. 1. As shown in FIG. 2, the method includes operations S21 to S24.

Operation S21: Acquire a first interface image of a target application.

In some embodiments, the target application runs on the electronic device. The electronic device may acquire the first interface image of the target application according to a screenshot request for the first interface image triggered by the user, or acquire the first interface image of the target application every target duration. The specific value of the target duration is not limited.

The target application is any type of application. In some embodiments, the target application includes, but is not limited to, a game application, an instant messaging application and a video application. When the target application is a game application, the interface image (including the first interface image, and a previous interface image, a second interface image, a historical interface image and the like mentioned below) is a game image. When the target application is an instant messaging application, the interface image is an instant messaging image. When the target application is a video application, the interface image is a video image.

The acquiring a first interface image of the target application includes: acquiring, in response to a screen reading instruction for a screen of the electronic device, screen data of the electronic device, the electronic device running the target application; and acquiring, according to the screen data, the first interface image of the target application. For example, the electronic device is a terminal device.

Since the terminal device runs the target application, the screen reading instruction for the screen of the terminal device may be a screenshot instruction for the first interface image triggered by the user, or triggered automatically every target duration. When the screen reading instruction for the screen of the terminal device is acquired, the terminal device acquires the screen data, and restores the first interface image of the target application according to the screen data.

In some embodiments, the acquiring a first interface image of the target application includes: displaying the first interface image, and displaying a floating window above the first interface image; and acquiring, in response to a trigger operation for the floating window, the first interface image.

The floating window is a window suspended above the first interface image. During the implementation process, a size of the floating window is smaller than a size of the first interface image. The floating window in some embodiments corresponds to a screen reading function, and the screen reading instruction for the screen of the terminal device is acquired in response to the trigger operation for the floating window. When the trigger operation for the floating window is received, the screen data of the terminal device is acquired, and the first interface image is acquired according to the screen data.

In some embodiments, the manner of triggering the trigger operation for the floating window is not limited. For example, the trigger operation for the floating window may be triggered by click/tap, long press, voice interaction, fingerprint recognition, etc.

It is to be understood that during the application process, the floating window may also correspond to other functions in addition to the screen reading function. In some embodiments, the functions corresponding to the floating window include, but are not limited to, a sound adjustment function, a brightness adjustment function, etc.

In general, one terminal device corresponds to one operating system, and different operating systems acquire screen data in different manners. The operating system of the terminal device, nor the manner in which the operating system acquires screen data are not limited herein.

Figure 3:
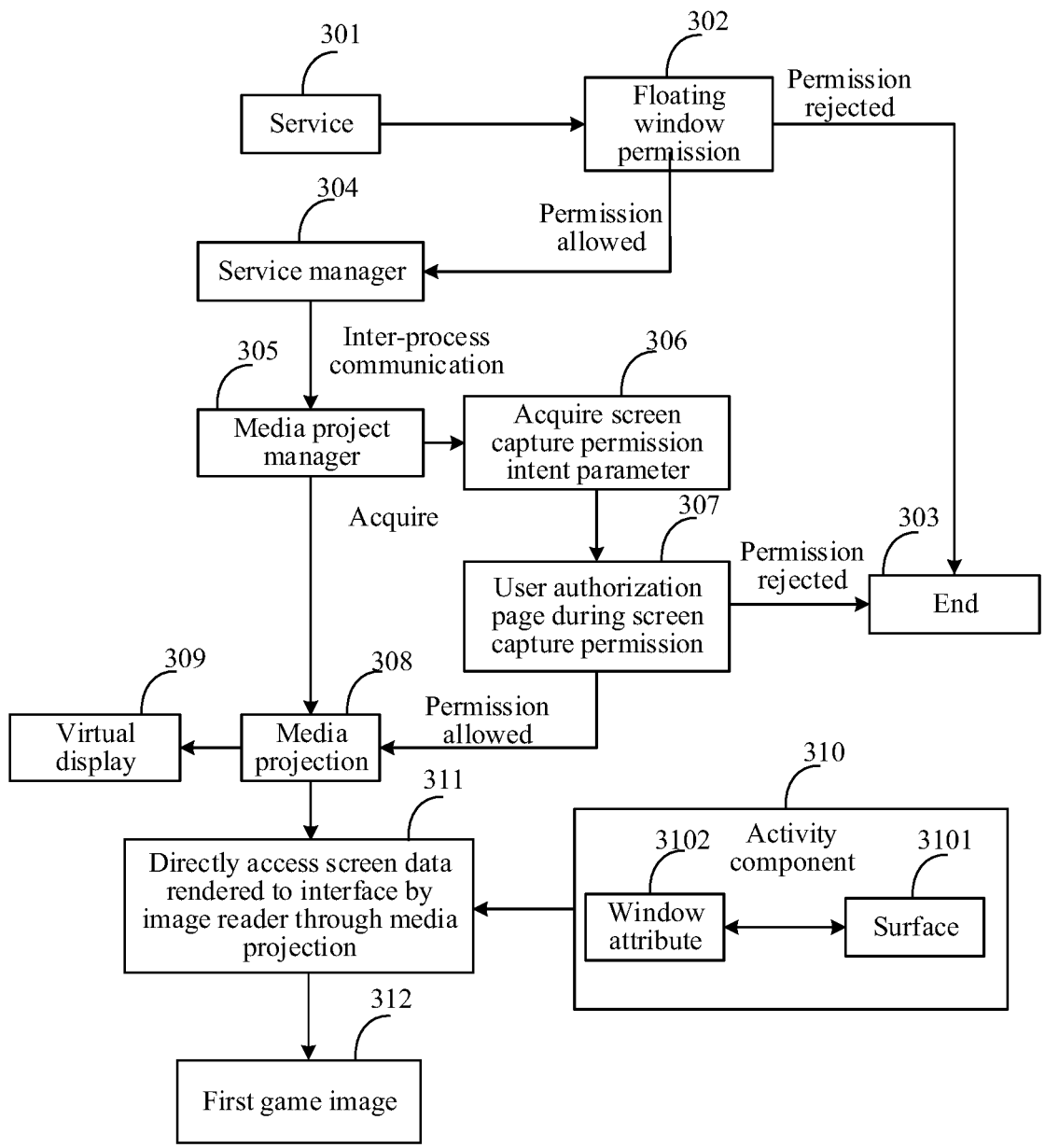
FIG. 3 is a schematic diagram of acquiring a first game image according to some embodiments.

Taking the operating system being Android and the target application being a game application as an example, as shown in FIG. 3, FIG. 3 is a schematic diagram of acquiring a first game image according to some embodiments. The process of acquiring the first game image is the process of acquiring the screen data of the terminal device, that is, the process of reading the screen.

The Android system provides a service 301 environment. In order to ensure the completeness of the screen reading function, it is required to dynamically register and apply for a floating window permission 302 of the Android system to ensure that a non-foreground process can have a valid context environment, and request the floating window permission from the user through the context. The floating window is a window that supports the screenshot function and is placed at the top of the screen layer.

If the permission is rejected, i.e., the acquisition of the floating window permission fails, then the process ends 303. If the permission is allowed, i.e., the user allows the application to have the floating window permission, then a service space acquires a service manager 304, and the service manager acquires a media project manager 305 through inter-process communication (i.e., Binder). The media project manager acquires a screen capture permission intent parameter 306. Based on the intent parameter, a permission management page of the Android system itself can be pulled up anonymously. That is, the intent parameter provides a function of a user authorization page during screen capture permission 307, which is equivalent to requesting a screen capture permission from the user.

If the permission is rejected, i.e., the acquisition of the screen capture permission fails, then the process ends 303. If the permission is allowed, i.e., the user allows the screen capture permission, then a media projection 308 is acquired through the media project manager, and the media projection is displayed on a virtual display 309.

For a display interface of the Android system, a surface 3101 is used for managing native display data of a screen compositor. Both the surface and a window attribute 3102 exist in an activity component 310, and there is a direct mapping relationship therebetween. There is only one window attribute in one activity component, and the data form of the window attribute is presented on the surface. Therefore, the screen data rendered to the interface is directly accessed by an image reader through the media projection 311, and the first game image 312 is obtained based on the screen data.

When the first game image is obtained based on the screen data, the first game image can be recovered through the screen data such as row attribute, column attribute and filling size attribute, and the first game image can be outputted to a bitmap, so that the first game image can be obtained by accessing bitmap parameters.

In some embodiments, the acquiring, according to the screen data, the first interface image of the target application includes: generating, in response to the screen data not containing status bar data, the first interface image according to the screen data; and filtering out, in response to the screen data containing the status bar data, the status bar data from the screen data to obtain interface data, and generating the first interface image according to the interface data.

The status bar is a display region containing related information of a current running status of the electronic device. In general, the status bar of a mobile phone is located at the top of the screen of the mobile phone, and includes time information, battery information, networking information, etc. The status bar of a computer (also called taskbar) is located at the bottom of the screen of the computer, and includes time information, networking information, virtual keyboard information, currently running application information, start menu information, etc.

It is to be understood that the content contained in the status bar of different electronic devices may be different, and the specific content in the status bar is not limited herein.

When the screen data does not contain the status bar data, it indicates that the electronic device displays the interface image in full screen, so the screen data only contains related data of the interface image. In this case, the first interface image of the target application is generated according to the screen data. When the screen data contains the status bar data, it indicates that the electronic device does not display the interface image in full screen, so the screen data contains related data of the interface image, the status bar data and the like. In this case, the status bar data is filtered out from the screen data to obtain the interface data, and the first interface image of the target application is generated according to the interface data.

Operation S22: Determine a first text contained in the first interface image, the first text being a text in a first language corresponding to the target application.

The first language is any language, that is, the first language may be the original language corresponding to the target application, or a language other than the original language corresponding to the target application. For example, if the target application corresponds to Chinese, then the first language is Chinese or English.

In general, one target application corresponds to one first language, and all texts in the target application are texts in the first language. In some embodiments, for the game application, the first text includes at least one of a text that comes with the game application and a text inputted by the user. The text that comes with the game application is usually the description text of the game, for example, the description text of how to win the game, the skill introduction text of virtual objects of the game, etc. The text inputted by the user is the text inputted by the user in the game application, for example, the communication text between users.

In some embodiments, the game running in the target application may be a static game, such as a card game, or a non-static game, such as a gun game and other real-time competitive games. Whether the game is static or non-static, from the perspective of interface images, the whole game process includes a plurality of consecutive interface images.

The determining a first text contained in a first interface image includes: acquiring a previous interface image of the first interface image from a plurality of consecutive interface images; determining, based on the first interface image and the previous interface image, at least one sub-image of the first interface image, the sub-image being an image region in which the first interface image is different from the previous interface image; and determining a text contained in each sub-image as the first text.

In some embodiments, the first interface image of the target application can be acquired many times. The first interface image acquired last time is the previous interface image of the currently acquired first interface image. By comparing the first interface image and the previous interface image, each sub-image in the first interface image is determined. Each sub-image is an image region not contained in the previous interface image. Then, the text contained in each sub-image is determined as the first text. By processing each sub-image instead of translating the text in the whole first interface image, the volume of data processed by the electronic device can be effectively reduced, which reduces the time consumption and improves the efficiency.

In some embodiments, the determining, based on the first interface image and the previous interface image, at least one sub-image of the first interface image includes: determining, based on pixel information of each pixel point in the first interface image and pixel information of each pixel point in the previous interface image, a pixel information difference between the corresponding pixel points; and determining, based on the pixel information of each pixel point, the at least one sub-image of the first interface image.

The pixel information of the pixel point includes, but not limited to, grayscale value, brightness value and color information of the pixel point. For each pixel point in the first interface image, based on the pixel information of the pixel point and the pixel information of the corresponding pixel point in the previous interface image, the pixel information difference of the pixel point is determined, that is, based on the pixel information of an i-th pixel point in the first interface image and the pixel information of an i-th pixel point in the previous interface image, the pixel information difference of the i-th pixel point in the first interface image is calculated. i is a positive integer. Then, based on the pixel information difference of each pixel point in the first interface image, each sub-image of the first interface image is determined.

In some embodiments, the pixel information is a grayscale value, and the pixel information difference is a difference in grayscale value. The determining, based on the pixel information difference of each pixel point, the at least one sub-image of the first interface image includes: gathering, according to the difference in grayscale value of each pixel point, satisfactory pixel points into at least one cluster, the satisfactory pixel point being a pixel point with a difference in grayscale value of greater than or equal to a difference threshold; and determining, according to position information of the pixel points of each cluster, each sub-image from the first interface image.

In some embodiments, when the first interface image and the previous interface image are both Red Green Blue (RGB) three-channel images, the first interface image and the previous interface image are grayed to convert the RGB three-channel images into single-channel grayscale images, thereby reducing the amount of calculation and improving the caching speed.

For the first interface image and the previous interface image of the single-channel grayscale image, based on the grayscale value of the i-th pixel point in the first interface image and the grayscale value of the i-th pixel point in the previous interface image, the difference in grayscale value of the i-th pixel point in the first interface image is calculated. i is a positive integer.

In some embodiments, based on the difference in grayscale value of the i-th pixel point, a grayscale difference result of the i-th pixel point is determined. In some embodiments, if the difference in grayscale value of the i-th pixel point is greater than or equal to the difference threshold, then the grayscale difference result of the i-th pixel point is marked as a first value. If the difference in grayscale value of the i-th pixel point is less than the difference threshold, then the grayscale difference result of the i-th pixel point is marked as a second value. This process is shown in the following formula (1), in which the difference threshold, the first value and the second value are not limited. For example, in the formula (1) below, the difference threshold is 10, the first value is 255, and the second value is 0.

$$Res(x, y) = \begin{cases} 255, |N(x, y) - O(x, y)| \geq 10| \\ 0, |N(x, y) - O(x, y)| < 10| \end{cases} \quad (1)$$

Res(x, y) is the grayscale difference result of the i-th pixel point in the first interface image, x is the abscissa of the i-th pixel point, y is the ordinate of the i-th pixel point, N(x,y) is the grayscale value of the i-th pixel point in the first interface image, and O(x,y) is the grayscale value of the i-th pixel point in the previous interface image.

Through the processing as shown in formula (1), the pixel points with a difference in grayscale value of greater than or equal to the difference threshold in the first interface image are selected. This part of the pixel points are the pixel points where the first interface image is different from the previous interface image. The pixel points with a difference in grayscale value of less than the difference threshold are the pixel points where the first interface image is not different from the previous interface image. In this way, preliminary clustering of the pixel points is realized.

Then, the pixel points with the difference in grayscale value of greater than or equal to the difference threshold are gathered into a cluster. In some embodiments, the adjacent two pixel points with the difference in grayscale value of greater than or equal to the difference threshold are gathered into one category, thereby obtaining each of the clusters. Each cluster includes at least one pixel point. For each cluster, based on the position information of each pixel point in the cluster, one sub-image is determined from the first interface image. That is, one cluster corresponds to one sub-image.

Figure 4:
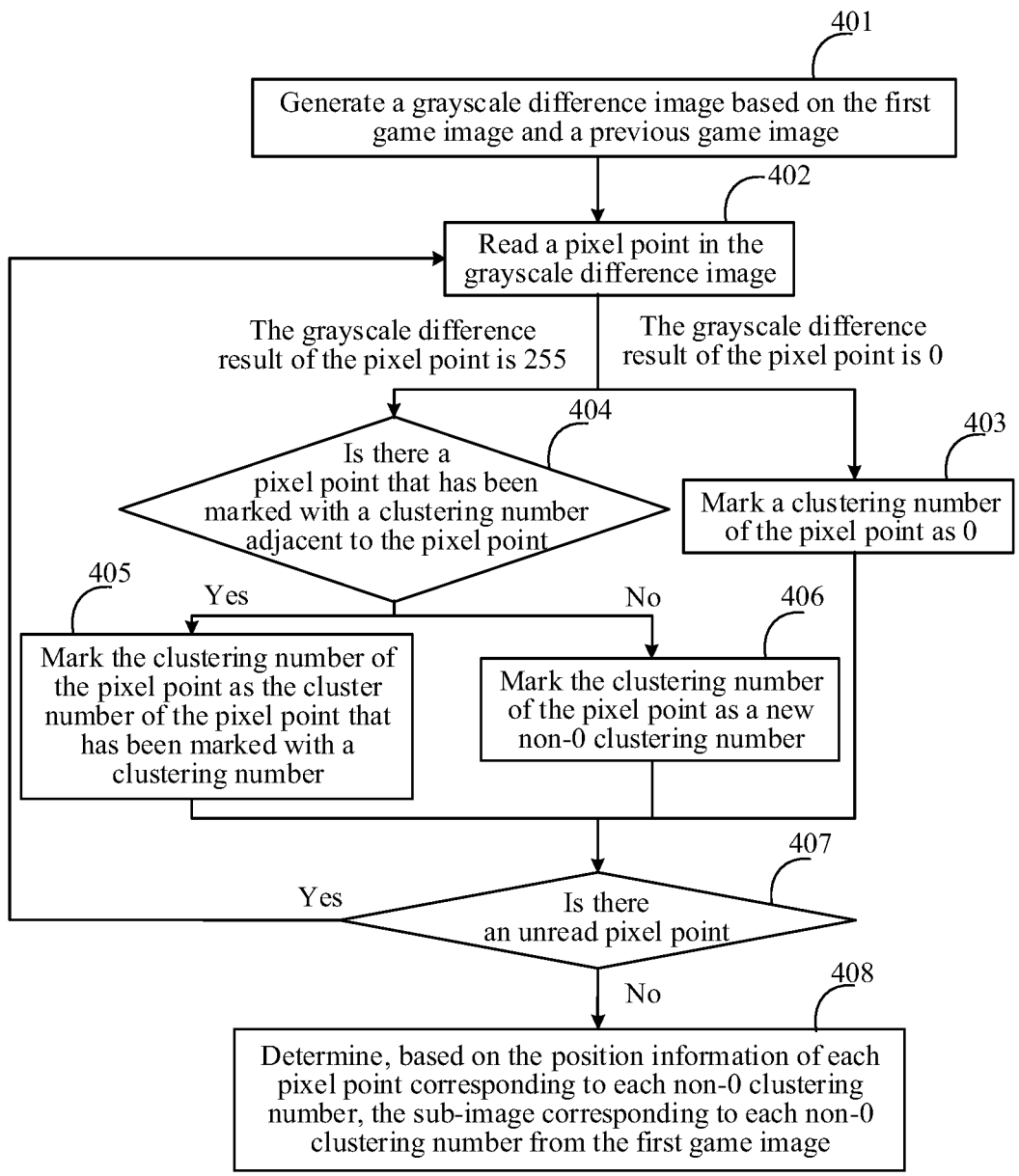
FIG. 4 is a schematic diagram of determining a sub-image from the first game image according to some embodiments.

In some embodiments, as shown in FIG. 4, FIG. 4 is a schematic diagram of determining a sub-image from the first game image according to some embodiments, Specifically, including the following operations:

Operation 401: Generate a grayscale difference image based on the first game image and a previous game image. A value of each pixel point in the grayscale difference image is the grayscale difference result.

Operation 402: Read a pixel point in the grayscale difference image. If the grayscale difference result of the pixel point is 0, operation 403 is executed to mark a clustering number of the pixel point as 0. If the grayscale difference result of the pixel point is 255, operation 404 is executed to further determine whether there is a pixel point that has been marked with a clustering number adjacent to the pixel point.

If so, that is, there is a pixel point that has been marked with a clustering number adjacent to the pixel point, operation 405 is executed to mark the clustering number of the pixel point as the cluster number of the pixel point that has been marked with a clustering number. If not, that is, there is no pixel point that has been marked with a clustering number adjacent to the pixel point, then operation 406 is executed to mark the clustering number of the pixel point as a new non-0 clustering number.

Then, operation 407 is executed to determine whether there is an unread pixel point. If so, that is, there is an unread pixel point, then operation 402 is executed to read the pixel point in the grayscale difference image. If not, that is, there is no unread pixel point, then operation 408 is executed to determine, based on the position information of each pixel point corresponding to each non-0 clustering number, the sub-image corresponding to each non-0 clustering number from the first game image.

In some embodiments, the determining the text contained in each sub-image as the first text includes: determining, for each sub-image, a pixel information difference between the first pixel point and the second pixel point based on pixel information of a first pixel point in the sub-image and pixel information of a second pixel point in the sub-image, the second pixel point being a pixel point located at a designated position in the sub-image, and the first pixel point being a pixel point in the sub-image other than the second pixel point; and determining, according to the pixel information difference between the first pixel point and the second pixel point in the sub-image, the first text contained in the sub-image.

The second pixel point is a pixel point in the sub-image. In general, the second pixel point is the pixel point at the edge of the sub-image, for example, the second pixel point is the pixel point corresponding to the upper-left vertex of the sub-image. For each sub-image, the first text contained in the sub-image is determined by calculating a pixel information difference between the first pixel point and the second pixel point in the sub-image.

In some embodiments, the pixel information is a grayscale value, and the pixel information difference is a difference in grayscale value. The determining, according to the pixel information difference between the first pixel point and the second pixel point in the sub-image, the first text contained in the sub-image includes: determining a plurality of maxima of the difference in grayscale value from the difference in grayscale value between the first pixel point and the second pixel point in the sub-image; and determining, based on a plurality of first pixel points corresponding to the plurality of maxima, the first text contained in the sub-image.

In some embodiments, when the sub-image is a RGB three-channel image, the sub-image is grayed to convert the RGB three-channel image into a single-channel grayscale image, thereby reducing the amount of calculation and improving the caching speed. For the sub-image of the single-channel grayscale image, based on the grayscale value of an i-th first pixel point in the sub-image and the grayscale value of the second pixel point in the sub-image, the difference in grayscale value of the i-th first pixel point in the sub-image is calculated. i is a positive integer.

After the difference in grayscale value of each first pixel point in the sub-image is calculated according to the above manner, the plurality of first pixel points corresponding to the plurality of maxima are used to form the first text contained in the sub-image.

Figure 5:
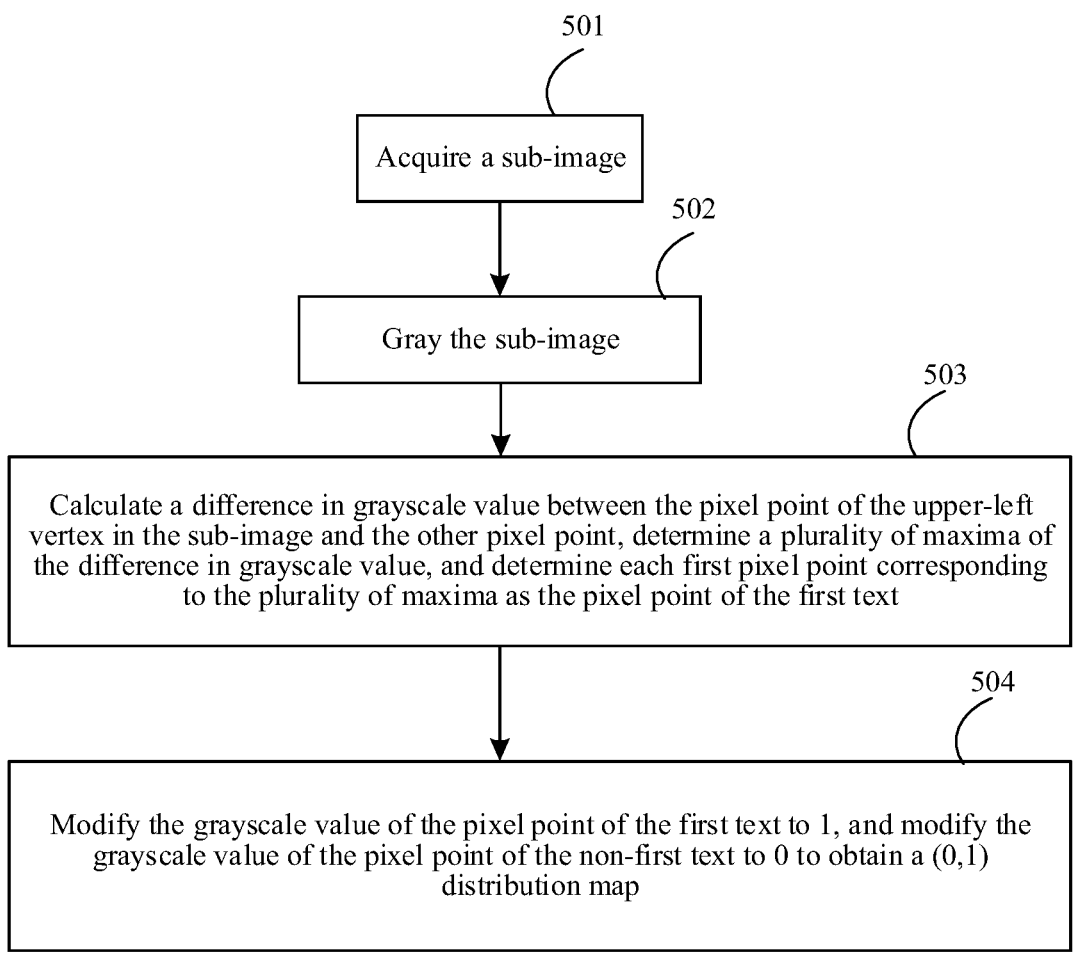
FIG. 5 is a flowchart of determining a first text contained in the sub-image according to some embodiments.

In some embodiments, as shown in FIG. 5, FIG. 5 is a flowchart of determining a first text contained in the sub-image according to some embodiments, specifically, including the following operations:

Operation 501: Acquire a sub-image.

Operation 502: Gray the sub-image.

Operation 503: Calculate a difference in grayscale value between the pixel point of the upper-left vertex in the sub-image and the first pixel point, determine a plurality of maxima of the difference in grayscale value, and determine each first pixel point corresponding to the plurality of maxima as the pixel point of the first text, the pixel point of the upper-left vertex in the sub-image is the second pixel point mentioned above.

For example, the values of the differences in grayscale value are sorted from largest to smallest, and top N differences in grayscale value are taken as N maxima. The value of N is related to the total number of pixel points in the sub-image.

Operation 504: Modify the grayscale value of the pixel point of the first text to 1, and modify the grayscale value of the pixel point of the non-first text to 0 to obtain a (0,1) distribution map. This (0,1) distribution map is the image of the first text contained in the sub-image.

The manner of determining the text based on the difference mechanism described above is simple and feasible, and can ensure the processing efficiency of text recognition, thereby minimizing the time for acquiring the translation result and ensuring real-time translation.

Operation S23: Acquire a second text obtained by translating the first text, the second text being a text in a second language.

In some embodiments, the manner of translating the first text is not limited. For example, the first text may be recognized by Optical Character Recognition (OCR) technology and then translated, or the first text may be translated directly by using a neural network model, thereby obtaining the second text. That is, the text in the first language is translated into the text in the second language. The first language and the second language are different languages. For example, the first language is the original language corresponding to the target application, and the second language is a language other than the original language.

In some embodiments, the acquiring a second text obtained by translating the first text includes: acquiring, for each of the sub-images, the second text corresponding to the sub-image stored in a storage region in a case that the second text corresponding to the sub-image is stored in the storage region, the second text being obtained by translating the first text contained in the sub-image; and translating the first text contained in the second sub-image to obtain the second text corresponding to the sub-image in a case that the second text corresponding to the sub-image is not stored in the storage region.

In practical applications, the texts in the target application may be repetitive and identical, for example, the skill introduction text of the virtual objects of the game is constant. If each text is translated in real time, this will cause a waste of resources and an increase in time cost. According to some embodiments, the second text corresponding to each sub-image of the historical interface image is stored in a storage region. Therefore, the storage region is searched first. When the second text corresponding to a certain sub-image of the first interface image is stored in the storage region, the second text corresponding to the sub-image can be quickly acquired from the storage region, thereby reducing the waste of resources and the time cost.

Specifically, the first interface image corresponds to at least one sub-image. For each sub-image, it is determined whether the second text corresponding to the sub-image is stored in the storage region. If the second text corresponding to the sub-image is stored in the storage region, then the sub-image is the first sub-image, and the second text corresponding to the first sub-image stored in the storage region is directly acquired. If the second text corresponding to the sub-image is not stored in the storage region, then the sub-image is the second sub-image, and the first text contained in the second sub-image is translated by using the OCR technology or the neural network model, thereby obtaining the second text corresponding to the second sub-image.

The storage region is not limited. In some embodiments, the storage region may be a cache region. Related information of the historical interface image is stored in the storage region.

In some embodiments, the related information is stored in the form of a list. The list includes the original text of the first text, position information of the first text, color information of the first text, size information of the first text, the original text of the second text, etc.

In some embodiments, each sub-image of the historical interface image is stored in the storage region. Therefore, the related information includes information of each sub-image in the historical interface image. The information of each sub-image includes image information (such as the (0,1) distribution map mentioned above) of the sub-image, position information of the first text contained in the sub-image, color information of the first text contained in the sub-image, size information of the first text contained in the sub-image, position information of the second text contained in the sub-image, color information of the second text contained in the sub-image, size information of the second text contained in the sub-image, etc.

The historical interface image includes the previous interface image mentioned above.

In some embodiments, after the acquiring the second text obtained by translating the first text, the method further includes: storing related information of the first interface image in the storage region, the related information of the first interface image includes at least one of: position information of the first text, color information of the first text, size information of the first text, position information of the second text, color information of the second text and size information of the second text.

In an actual implementation, the related information of the first interface image may be stored in the storage region. The related information is stored in the form of a list. The related information of the first interface image includes information of each sub-image in the first interface image.

For the information of each sub-image, reference can be made to the previous related description, which will not be repeated here.

Figure 6:
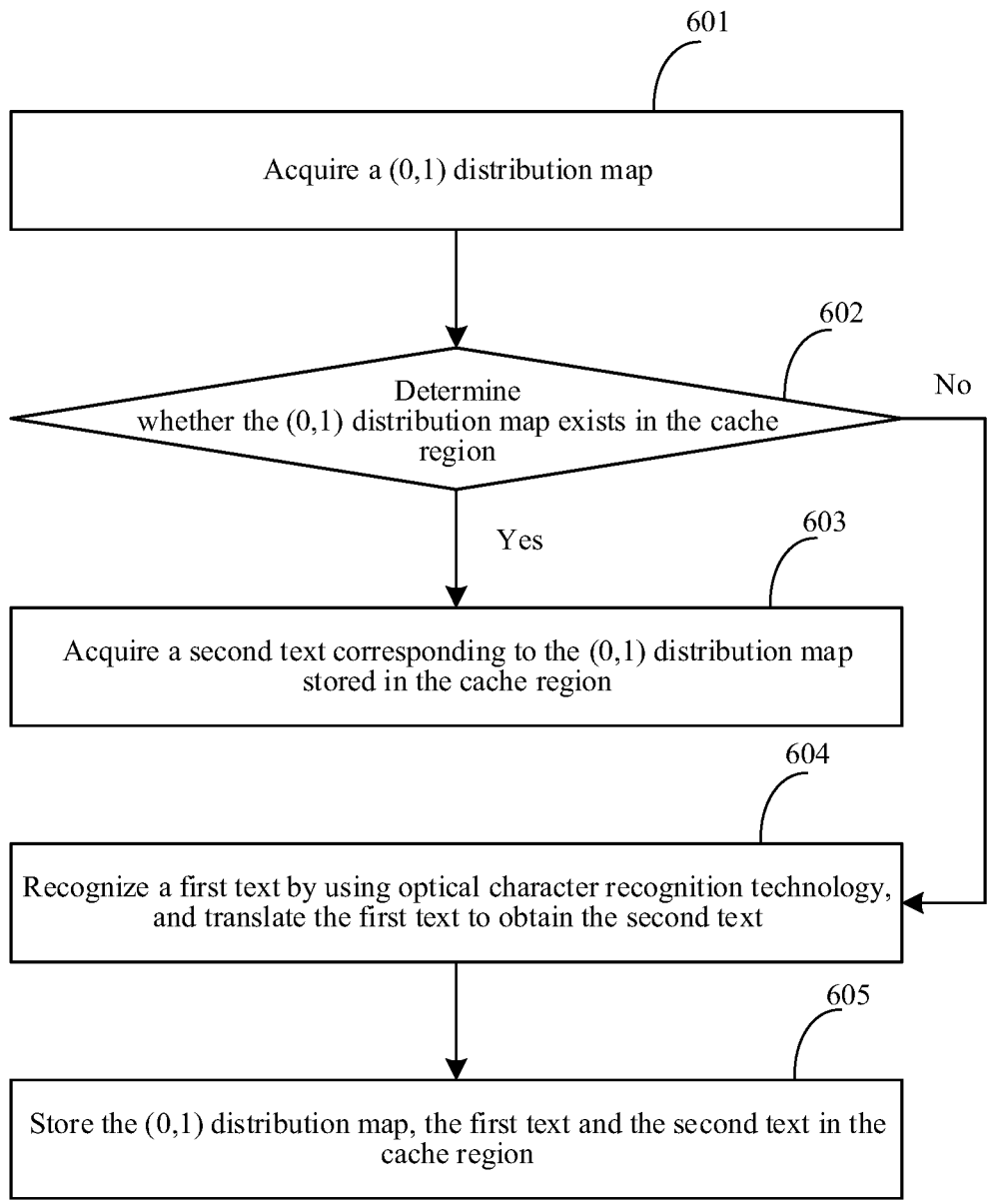
FIG. 6 is a schematic diagram of acquiring a second text corresponding to the sub-image according to some embodiments.

As shown in FIG. 6, FIG. 6 is a schematic diagram of acquiring a second text corresponding to the sub-image according to some embodiments, including the following operations:

Operation 601: Acquire a (0,1) distribution map.

As can be seen from FIG. 5, each sub-image may be processed into a (0,1) distribution map.

Operation 602: Determine whether the (0,1) distribution map exists in the cache region. If so, that is, the (0,1) distribution map exists in the cache region, then operation 603 is executed to directly acquire the second text corresponding to the (0,1) distribution map stored in the cache region. If not, that is, the (0,1) distribution map does not exist in the cache region, then operation 604 is executed to recognize the first text by using optical character recognition technology, and translate the first text to obtain the second text. Then, operation 605 is executed to store the (0,1) distribution map, the first text and the second text in the cache region.

In some embodiments, a Least Recently Used (LRU) may be used to determine whether the sub-image or the (0,1) distribution map exists in the cache region. Through this algorithm, the corresponding elements can be found faster. In practical applications, the distribution ratio of the pixel points of the first text to the pixel points of the non-first text in the sub-image or the (0,1) distribution map may be used as a distribution ratio to be matched, and be matched with the distribution ratio of the pixel points of the first text and the pixel points of the non-first text in the cache region. If there is a distribution ratio in the cache region consistent with the distribution ratio to be matched, then it is determined that the sub-image or the (0,1) distribution map exists in the cache region. If there is no distribution ratio in the cache region consistent with the distribution ratio to be matched, then it is determined that the sub-image or the (0,1) distribution map does not exist in the cache region.

The sub-image is an image region in which the first interface image is different from the interface image. After the second text corresponding to each sub-image is acquired, for the image region in which the first interface image is not different from the previous interface image (i.e., identical image region), the second text corresponding to the identical image region can be directly acquired from the storage region based on the related information of the previous interface image stored in the storage region, thereby greatly reducing the translate duration and improving the efficiency.

Operation S24: Replace the first text in the first interface image with the second text to obtain a second interface image, and display, based on the target application, the second interface image.

In some embodiments, the first text in the first interface image is replaced with the second text, and the second interface image is displayed based on the target application. Since the second interface image contains the text in the second language and the second interface image is directly displayed based on the target application, the user can directly view the translation result without affecting the user's use of the target application, which improves the efficiency of human-computer interaction.

The displaying, based on the target application, the second interface image includes: displaying in full screen, in response to the screen data not containing the status bar data, the second interface image on the screen of the electronic device based on the target application; and generating, in response to the screen data containing the status bar data, an image to be displayed based on the status bar data and the second interface image, and displaying the image to be displayed on the screen of the electronic device.

When the screen data does not contain the status bar data, it indicates that the electronic device displays the interface image in full screen, so the content related to the first text in the screen data is replaced with the second text to replace the first text in the first interface image with the second text, thereby obtaining the second interface image, and the second interface image is displayed in full screen on the screen of the terminal device based on the target application. When the screen data contains the status bar data, it indicates that the electronic device does not display the interface image in full screen. The content related to the first text in the interface data is replaced with the second text to replace the first text in the first interface image with the second text, thereby obtaining the second interface image, and the image to be displayed is generated based on the second interface image and the status bar data, that is, the content related to the first text in the screen data is replaced with the content of the second text to generate the image to be displayed. Then, the image to be displayed is displayed on the screen of the terminal device.

Figure 7:
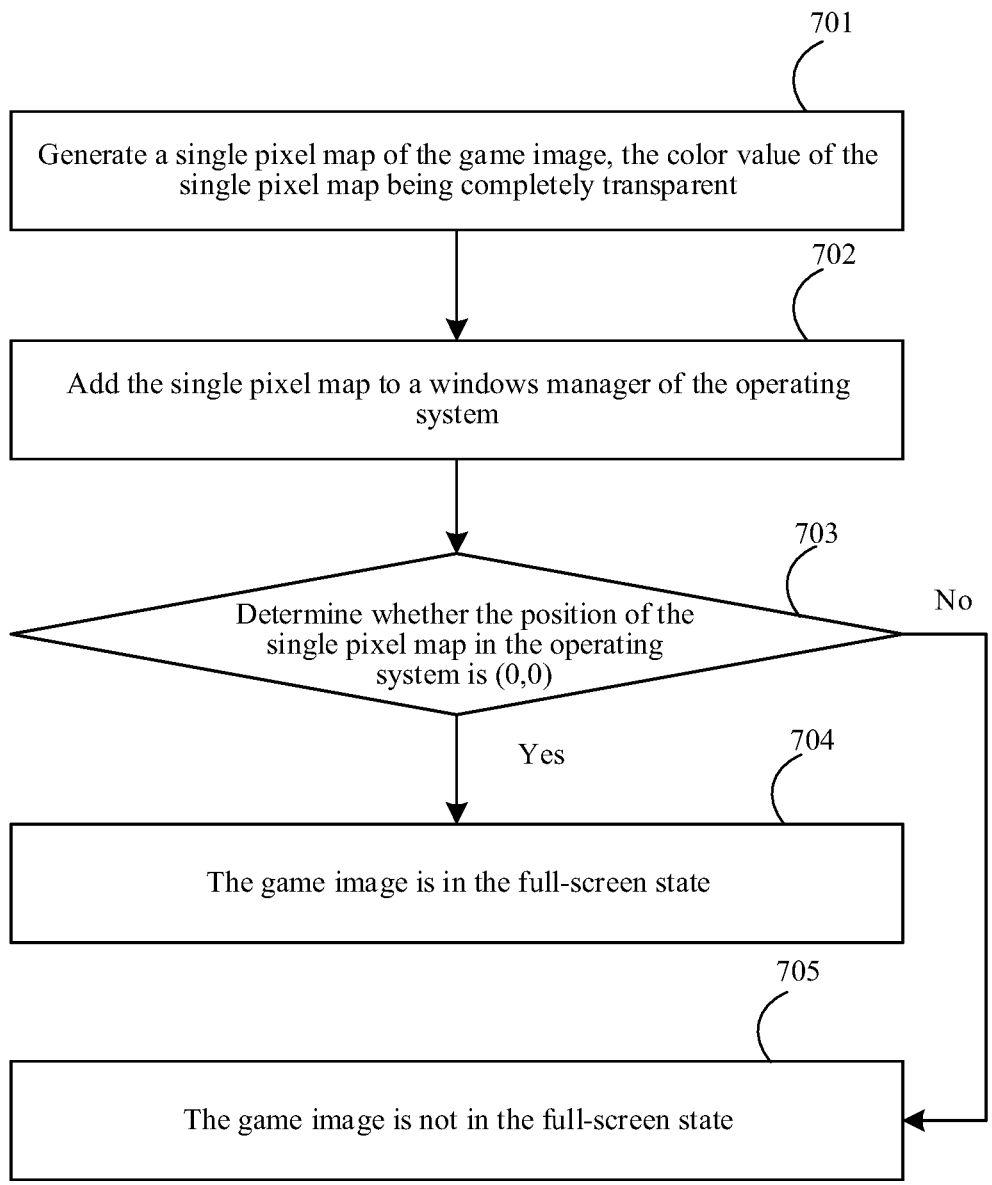
FIG. 7 is a schematic diagram of determining whether a game image is in a full-screen state according to some embodiments.

In practical applications, it can be determined whether the interface image is in a full-screen state by a single pixel map. As shown in FIG. 7, FIG. 7 is a schematic diagram of determining whether a game image is in a full-screen state according to some embodiments, specifically, including the following operations:

Operation 701: Generate a single pixel map of the game image, the color value of the single pixel map being completely transparent.

Operation 702: Add the single pixel map to a windows manager of the operating system.

Operation 703: Determine whether the position of the single pixel map in the operating system is (0,0). If so, that is, the position of the single pixel map in the operating system is (0,0), then operation 704 is executed to determine that the game image is in the full-screen state. If not, that is, the position of the single pixel map in the operating system is not (0,0), then operation 705 is executed to determine that the game image is not in the full-screen state.

The single pixel map refers to the coordinates of the upper-left vertex of the game image. The color value of the single pixel map is set to be completely transparent, which can avoid affecting the display effect of the game image.

The window manager is a tool for managing the display interface, which can control the size, transparency and content of the display interface.

When the interface image is in the full-screen state, it indicates that the screen data does not contain the status bar data. In this case, the second interface image is displayed in full screen on the screen of the terminal device. When the interface image is not in the full-screen state, it indicates that the screen data contains the status bar data. In this case, the image to be displayed is generated based on the status bar data and the second interface image, and the image to be displayed is displayed on the screen of the terminal device.

This manner of automatically detecting screen display attributes avoids the problem that the translation result outputted to the screen contains the status bar of the screen when in the full-screen state, and provides a compatible detection method to ensure that the status of the screen, including full screen/non-full screen, can be automatically detected under different manufacturers' models.

In some embodiments, the displaying, based on the target application, the second interface image includes: displaying, based on the target application, the second interface image above the first interface image, the second interface image completely covering the first interface image.

In some embodiments, the second interface image is obtained based on the first interface image. Then, when the second interface image is displayed based on the target application, in some embodiments, the first interface image is not displayed, but the second interface image is directly displayed based on the target application. In some embodiments, on the basis that the first interface image is displayed based on the target application, the second interface image is further displayed based on the target application, and the layer of the second interface image is placed above the layer of the first interface image. That is, the second interface image completely covers the first interface image, so that the user can view the second interface image.

Figure 8:
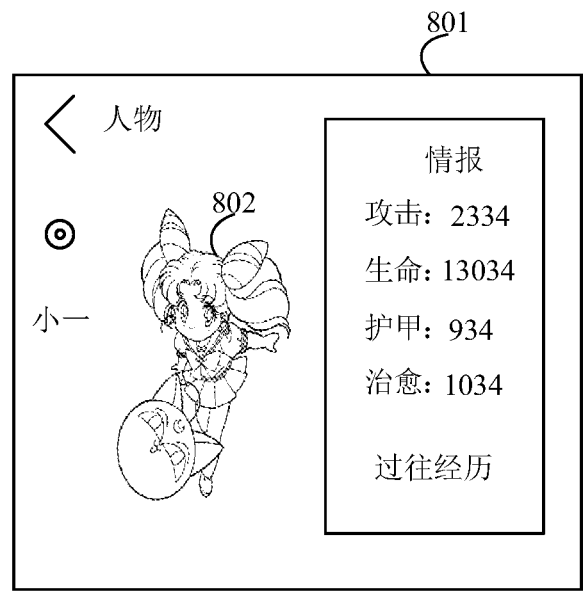
FIG. 8 is a schematic diagram of a first game image according to some embodiments.
Figure 9:
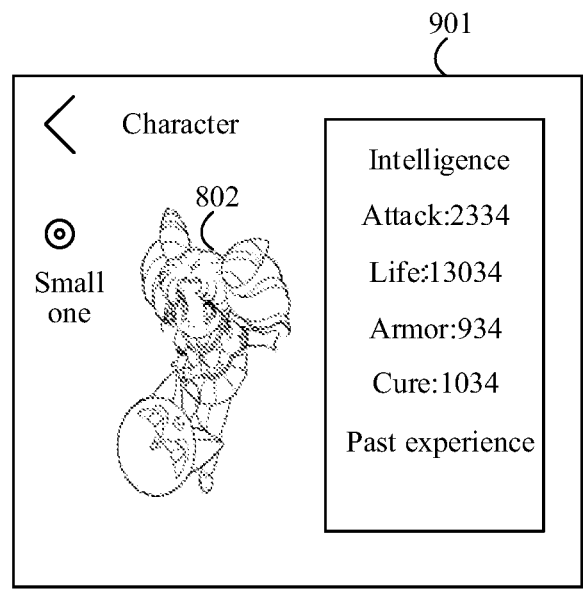
FIG. 9 is a schematic diagram of a second game image according to some embodiments.

FIG. 8 is a schematic diagram of a first game image according to some embodiments, and FIG. 9 is a schematic diagram of a second game image according to some embodiments.

As shown in FIG. 8, the first game image 801 includes a first text and an image 802 of a virtual character. The first text is a Chinese text. The first text includes "人物", "小一", "情报," " "攻击: 2334", " "生命: 13034", " "护甲: 934", " "治愈: 1034" and " "过往经历"".

As shown in FIG. 9, the second game image 901 includes a second text and the image 802 of the virtual character contained in the first game image. The second text is an English text. The second text includes: the translated text "Character" corresponding to " "人物"", the translated text "Small one" corresponding to ""小一"", the translated text "Intelligence" corresponding to ""情报"", the translated text "Attack: 2334" corresponding to " "攻击: 2334", " "生命: 13034" corresponding to " "生命: 13034", " "护甲: 934" corresponding to " "护甲: 934", " "治愈: 1034" corresponding to " "治愈: 1034", and the translated text "Past experience" corresponding to " 过往经历"".

FIG. 8 and FIG. 9 shows that the first game image 801 differs from the second game image 901 only in the language of the text in the game image.

It is to be understood that the screen of the terminal device does not display the first game image shown in FIG. 8, but directly displays the second game image shown in FIG. 9, which is convenient for the user to quickly view the translation result and improves the efficiency of human-computer interaction.

Figure 10:
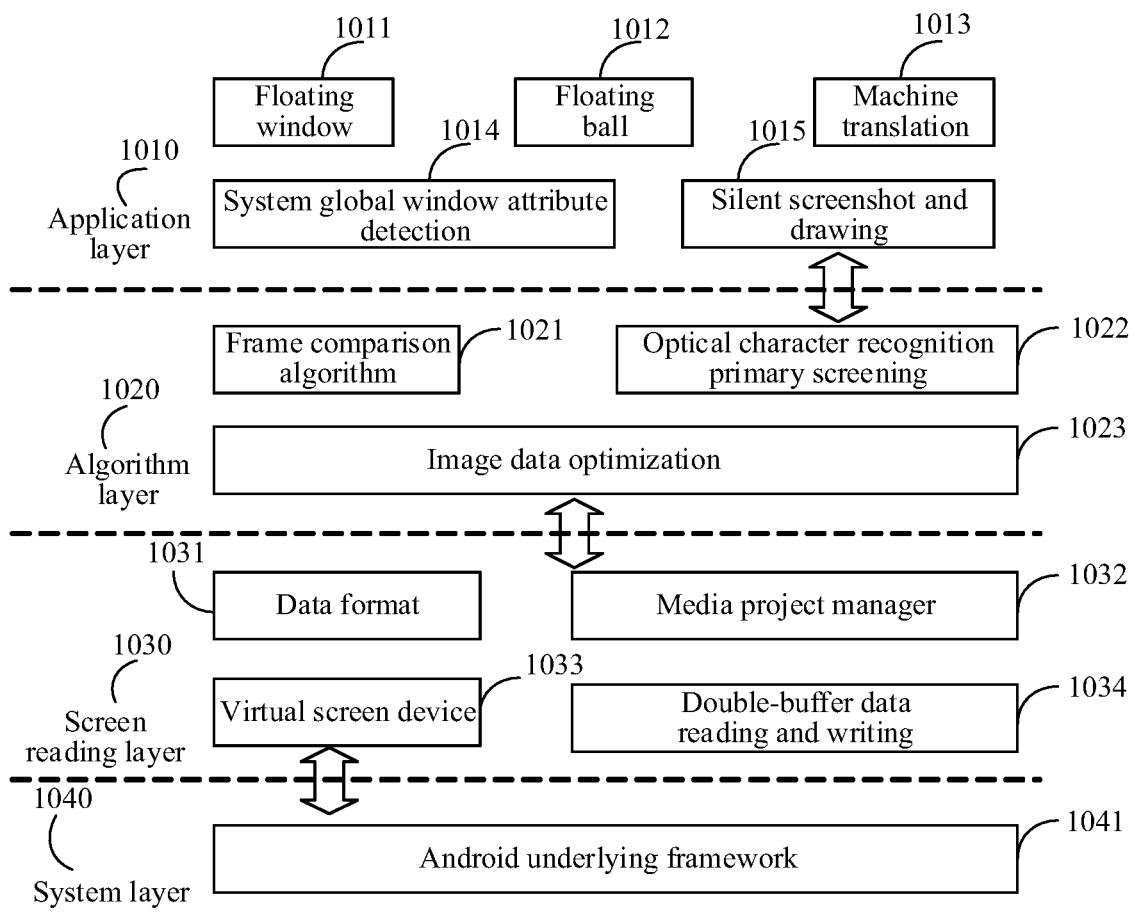
FIG. 10 is a schematic diagram of a system framework according to some embodiments.

Some embodiments have been introduced from the perspective of method operations above. The following is a further description in conjunction with a specific scenario. The scenario of some embodiments is a mobile game scenario, i.e., the game application runs in a mobile phone, and the operating system in the mobile phone is the Android system. As shown in FIG. 10, FIG. 10 is a schematic diagram of a system framework according to some embodiments. The system framework includes an application layer 1010, an algorithm layer 1020, a screen reading layer 1030 and a system layer 1040.

The application layer 1010 is used for providing information of floating window 1011, floating ball 1012, machine translation 1013 and screenshot (not shown). The information includes an upper-layer user interface (UI) and operation logic. The floating window 1011 and the floating ball 1012 are layers that support multiple functions, including, but not limited to, a screenshot function, a sound adjustment function, a brightness adjustment function, etc. The application layer 1010 provides a method to keep the UI on the upper layer of any other App, which prevents the tap, drag or other operations from affecting the translation of the UI while the user is playing the mobile game.

At the same time, the application layer 1010, combined with a system global window attribute detection 1014 mechanism, can realize silent screenshot and drawing 1015 on a non-root mobile phone, that is, acquire the game image, acquire the translation result through machine translation, and draw the text of the translation result to the upper layer of any other App.

The advantage of this is that the terminal device can realize the functions of floating ball and floating window without rooting the mobile phone. A rooted mobile phone refers to a mobile phone that can go beyond the restrictions of mobile phone manufacturers. The rooted mobile phone can allow the user to uninstall applications pre-installed in the mobile phone by mobile phone manufacturers, operators and third-party distributors, and can run some applications that require a root permission. The silent screenshot means that when taking a screenshot, the user does not need to apply for permissions, and there is no pop-up window.

The algorithm layer 1020 is located below the application layer 1010, and used for receiving the screenshot request (i.e., screen reading request) of the application layer 1010 and forwarding the screenshot request to the screen reading layer 1030, such that the screen reading layer 1030 acquires the screen data.

Moreover, the algorithm layer 1020 further provides a frame comparison algorithm 1021 to assist the application layer 1010 in determining whether it is in an animation scenario, thereby further improving the real-time performance. The algorithm layer 1020 can perform OCR primary screening 1022, which avoids translating the whole screenshot and avoid excessive processing time. In addition, the algorithm layer 1020 can perform image data optimization 1023 on the screenshot acquired by the screen reading layer 1030, which reduces the processing time and improves the real-time effect.

The screen reading layer 1030, also called the adaptation layer, is mainly used for receiving the screenshot request forwarded by the algorithm layer 1020; specifying a data format 1031 of the screen data and the screenshot; creating a virtual screen device 1033 by using a media project manager 1032, and receiving the screen data transmitted by an Android underlying framework onto the virtual screen device 1033; and generating the screenshot by using the screen data based on double-buffer data reading and writing 1034 technology The system layer 1040 includes an Android underlying framework 1041 for providing a programming interface.

In some embodiments, through the cooperation of the application layer, the algorithm layer, the screen reading layer, etc., the screenshot may be acquired first. The screenshot includes the first game image. Then, the second text corresponding to the first text contained in the first game image is acquired, and the first text contained in the first game image is replaced with the second text to obtain the second game image. The second game image is displayed based on the game application.

For the algorithm layer and the working layers below, every screenshot instruction of the upper layer triggers a screen reading operation. This operation is time-consuming, and difficult to be used in real-time translation of a mobile game. The main reason for this problem is that the game scenario on the mobile phone is not a static page. If a timer is used to trigger the underlying to read the screen, generate a bitmap and transmit it to the upper layer for response, the time consumption during this period will be multiplied by the product of the game frame rate and the screen resolution. Moreover, the algorithm layer also solves some compatibility problems caused by notches, horizontal and vertical screens, and ensures that the upper and lower layers can work normally.

For a scenario of real-time translation of a mobile game with many dynamic pages, the most time-consuming scenarios are mainly OCR image processing events and the network overhead brought by the translation background interface request. In contrast, the time consumption of the screen reading layer is relatively not a major influence factor, so the algorithm layer will be optimized for this scenario.

Figure 11:
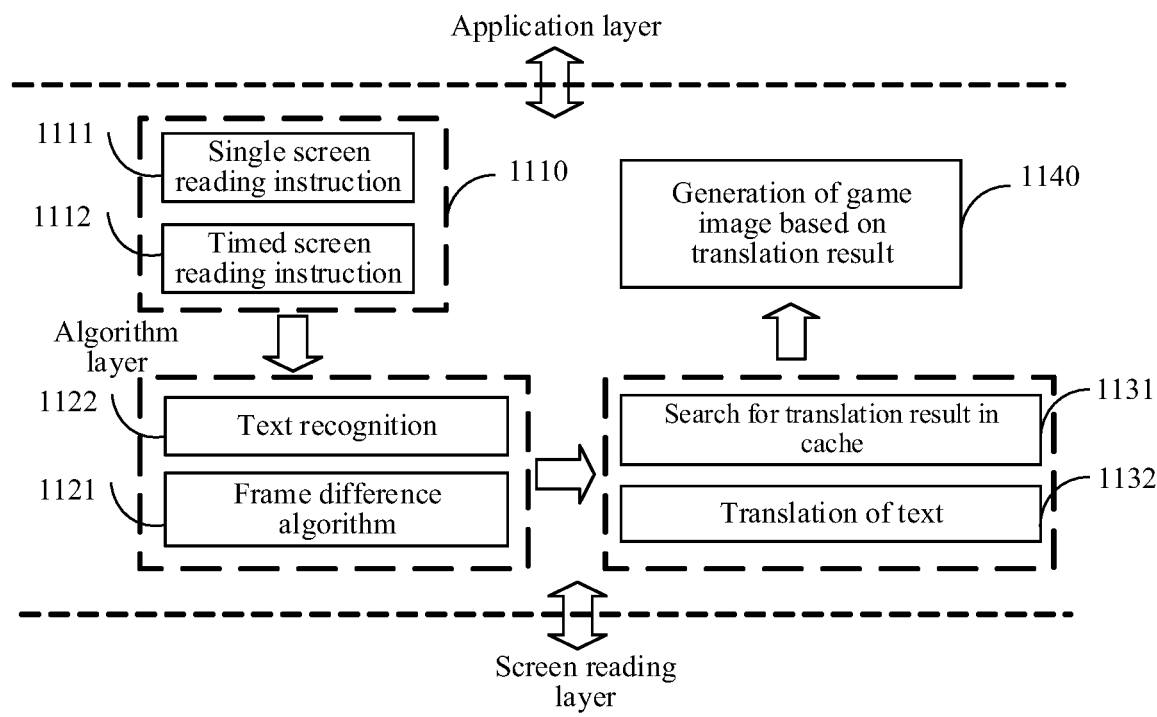
FIG. 11 is a schematic diagram of an algorithm layer framework according to some embodiments.

As shown in FIG. 11, FIG. 11 is a schematic diagram of an algorithm layer framework according to some embodiments. Specifically, the algorithm layer provides implementation logic 1110 for a single screen reading instruction 1111 or a timed screen reading instruction 1112. The single screen reading instruction 1111 is a screenshot request for the first game image triggered by the user, and the timed screen reading instruction 1112 is an instruction to acquire the first game image of the game application every target duration. The application layer receives the screenshot request triggered by the user and sends the screenshot request to the algorithm layer. The screenshot request is forwarded by the algorithm layer to the screen reading layer. The screen reading layer acquires screen data, acquires the first game image of the game application based on the screen data, and sends the first game image to the algorithm layer for processing.

First, the algorithm layer determines each sub-image of the first game image based on a frame difference algorithm 1121. Specifically, a grayscale difference image is generated based on the first game image and the previous game image, and each sub-image of the first game image is determined based on the grayscale difference result of each pixel point in the grayscale difference image. For details, reference can be made to the related description of FIG. 4, and the details will not be repeated here.

Next, the algorithm layer performs text recognition 1122. That is, for each sub-image of the first game image, the algorithm layer may recognize the first text contained in the sub-image. Specifically, the sub-image is grayed first, and then a difference in grayscale value between the first pixel point and the pixel point of the upper-left vertex is calculated. The pixel point corresponding to the maximum difference in grayscale value is the pixel point of the first text. For details, reference can be made to the related description of FIG. 5, and the details will not be repeated here.

Then, the algorithm layer may search for the translation result 1131 in the cache, or translate the text 1132. Specifically, for each sub-image of the first game image, if the second text corresponding to the sub-image is stored in the cache region, then the second text corresponding to the sub-image is directly acquired. If the second text corresponding to the sub-image is not stored in the cache region, then the first text contained in the sub-image is recognized by OCR technology and then translated to obtain the second text. For details, reference can be made to the related description of FIG. 6, and the details will not be repeated here.

Then, the algorithm layer generates the game image 1140 based on the translation result. That is, after the second text corresponding to each sub-image of the first game image is obtained, the first text in the first game image is replaced with the second text to obtain the second game image. The algorithm layer sends the second game image to the application layer, and the application layer displays the second game image based on the game application.

Figure 12:
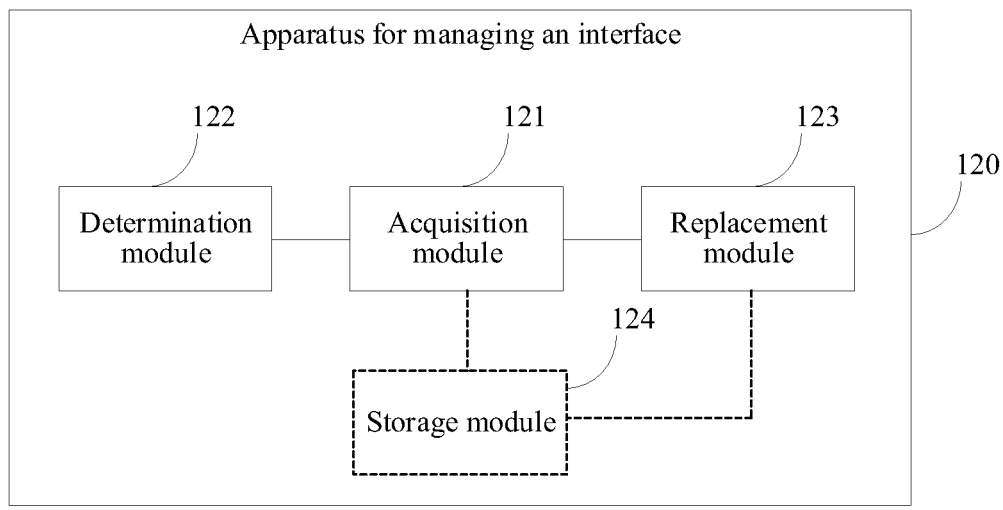
FIG. 12 is a schematic structural diagram of an apparatus for managing an interface according to some embodiments.

FIG. 12 is a schematic structural diagram of an apparatus for managing an interface 120 according to some embodiments. As shown in FIG. 12, the apparatus includes an acquisition module 121, a determination module 122 and a replacement module 123.

The acquisition module 121 is configured to acquire a first interface image of a target application.

The determination module 122 is configured to determine a first text contained in the first interface image. The first text is a text in a first language corresponding to the target application.

The acquisition module 121 is further configured to acquire a second text obtained by translating the first text. The second text is a text in a second language.

The replacement module 123 is configured to replace the first text in the first interface image with the second text to obtain a second interface image, and display, based on the target application, the second interface image.

In some embodiments, the determination module 122 is configured to acquire a previous interface image of the first interface image from a plurality of consecutive interface images; determine, based on the first interface image and the previous interface image, at least one sub-image of the first interface image, the sub-image being an image region in which the first interface image is different from the previous interface image; and determine a text contained in each of the sub-images as the first text.

In some embodiments, the determination module 122 is configured to determine, based on pixel information of each pixel point in the first interface image and pixel information of each pixel point in the previous interface image, a pixel information difference between the corresponding pixel points; and determine, based on the pixel information difference, the at least one sub-image of the first interface image.

In some embodiments, the pixel information is a grayscale value, and the pixel information difference is a difference in grayscale value. The determination module 122 is configured to gather, according to the difference in grayscale value of each of the pixel points, satisfactory pixel points into at least one cluster, each of the satisfactory pixel points being a pixel point with a difference in grayscale value of greater than or equal to a difference threshold; and determine, according to position information of the pixel points of each of the clusters, each of the sub-images from the first interface image.

In some embodiments, the determination module 122 is configured to determine, for each of the sub-images, a pixel information difference between each first pixel point and a second pixel point in the sub-image based on pixel information of each of the first pixel points in the sub-image and pixel information of the second pixel point in the sub-image, the second pixel point being a pixel point located at a designated position in the sub-image, and each of the first pixel points being a pixel point in the sub-image other than the second pixel point; and determine, according to the pixel information difference between each of the first pixel points and the second pixel point in the sub-image, the first text contained in the sub-image.

In some embodiments, the pixel information is a grayscale value, and the pixel information difference is a difference in grayscale value. The determination module 122 is configured to determine a plurality of maxima of the difference in grayscale value from the difference in gray scale value between each of the first pixel points and the second pixel point in the sub-image; and determine, based on a plurality of first pixel points corresponding to the plurality of maxima, the first text contained in the sub-image.

In some embodiments, the acquisition module 121 is configured to acquire, for each of the sub-images, the second text corresponding to the sub-image stored in a storage region in a case that the second text corresponding to the sub-image is stored in the storage region, the second text being obtained by translating the first text contained in the sub-image; and translate the first text contained in the second sub-image to obtain the second text corresponding to the sub-image in a case that the second text corresponding to the sub-image is not stored in the storage region.

In some embodiments, the apparatus for managing an interface 120 further includes a storage module 124. The storage module 124 is configured to store related information of the first game image in the storage region, the related information of the first interface image includes at least one of: position information of the first text, color information of the first text, size information of the first text, position information of the second text, color information of the second text and size information of the second text.

In some embodiments, the acquisition module 121 is configured to acquire, in response to a screen reading instruction for a screen of an electronic device, screen data of the electronic device, the electronic device running the target application; and acquire, according to the screen data, the first interface image.

In some embodiments, the acquisition module 121 is configured to generate, in response to the screen data not containing status bar data, the first interface image according to the screen data; and filter out, in response to the screen data containing the status bar data, the status bar data from the screen data to obtain interface data, and generate the first interface image according to the interface data.

In some embodiments, the replacement module 123 is configured to display in full screen, in response to the screen data not containing the status bar data, the second interface image on the screen of the electronic device based on the target application; and generate, in response to the screen data containing the status bar data, an image to be displayed based on the status bar data and the second interface image, and display the image to be displayed on the screen of the electronic device.

In some embodiments, the replacement module 123 is configured to display, based on the target application, the second interface image above the first interface image, the second interface image completely covering the first interface image.

In some embodiments, the acquisition module 121 is configured to display the first interface image, and display a floating window above the first interface image; and acquire, in response to a trigger operation for the floating window, the first interface image.

It is to be understood that when the apparatus provided in FIG. 12 implements the functions of the apparatus, only division of the foregoing function modules is used as an example for description. In some embodiments, the functions may be allocated to and completed by different function modules according to requirements. That is, an internal structure of the device is divided into different function modules, to complete all or some of the functions described above. In addition, the apparatus provided by the above embodiments belong to a same conception as the method embodiment. For details of the specific implementation process, reference can be made to the method embodiment, and details will not be repeated here.

A person skilled in the art would understand that these "modules" could be implemented by hardware logic, a processor or processors executing computer software code, or a combination of both. These modules can also be implemented in software stored in memory or non-transitory computer-readable medium.

Figure 13:
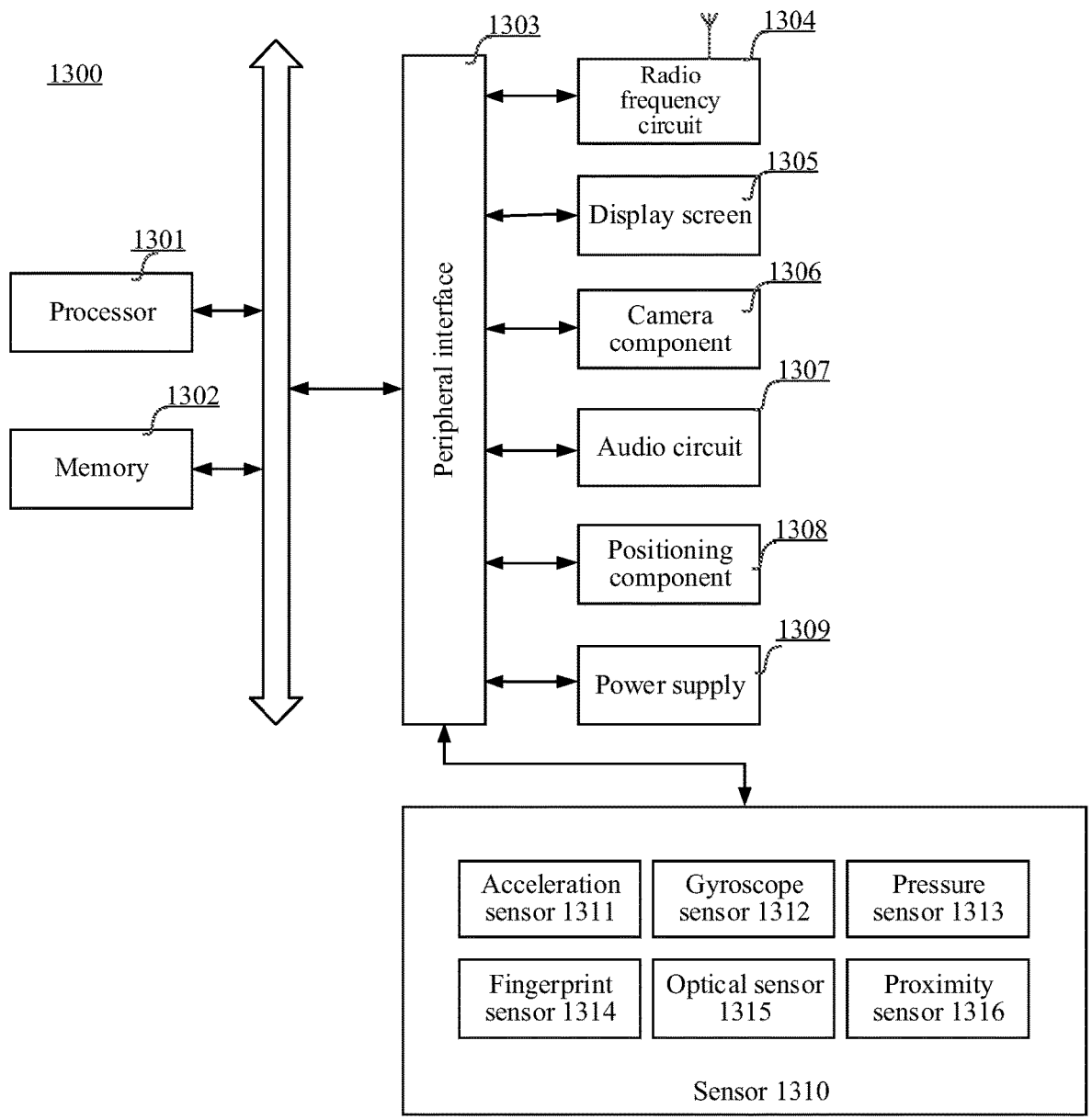
FIG. 13 is a schematic structural diagram of an electronic device according to some embodiments.

FIG. 13 shows a structural block diagram of an electronic device 1300 according to some embodiments. The electronic device 1300 may be a portable mobile terminal, for example, a smart phone, a tablet computer, a Moving Picture Experts Group Audio Layer III (MP3) player, a Moving Picture Experts Group Audio Layer IV (MP4) player, a notebook computer, or a desktop computer. The electronic device 1300 may also be referred to as another name such as user equipment, a portable terminal, a laptop terminal, or a desktop terminal.

Typically, the electronic device 1300 includes: a processor 1301 and a memory 1302.

The processor 1301 may include one or more processing cores, for example, a 4-core processor or an 8-core processor. The processor 1301 may be implemented in at least one hardware form of a digital signal processor (DSP), a field-programmable gate array (FPGA), and a programmable logic array (PLA). In some embodiments, the processor 1301 may further include an artificial intelligence (AI) processor. The AI processor is configured to process computing operations related to machine learning.

The memory 1302 may include one or more computer-readable storage media. The computer-readable storage medium may be non-transient. The memory 1302 may further include a high-speed random access memory and a nonvolatile memory, for example, one or more disk storage devices or flash storage devices. In some embodiments, the non-transitory computer-readable storage medium in the memory 1302 is configured to store at least one instruction. The at least one instruction is configured to be executed by the processor 1301 to implement the method for managing an interface provided in the method embodiments of the disclosure.

In some embodiments, the electronic device 1300 further includes: a peripheral device interface 1303 and at least one peripheral device. The processor 1301, the memory 1302 and the peripheral device interface 1303 may be connected through a bus or a signal cable. Each peripheral device may be connected to the peripheral device interface 1303 through a bus, a signal cable, or a circuit board. Specifically, the peripheral device includes: at least one of a radio frequency (RF) circuit 1304, a display screen 1305, a camera component 1306, an audio circuit 1307, a positioning component 1308, and a power supply 1309.

The peripheral device interface 1303 may be configured to connect the at least one peripheral device related to input/output (I/O) to the processor 1301 and the memory 1302. In some embodiments, the processor 1301, the memory 1302 and the peripheral device interface 1303 are integrated on a same chip or circuit board. In some other embodiments, any one or two of the processor 1301, the memory 1302 and the peripheral device interface 1303 may be implemented on a single chip or circuit board, which is not limited herein.

The RF circuit 1304 is configured to receive and transmit an RF signal. The display screen 1305 is configured to display a user interface (UI). The camera component 1306 is configured to capture images or videos. The audio circuit 1307 may include a microphone and a speaker. The positioning component 1308 is configured to determine a current geographic location of the electronic device 1300, to implement a navigation or a location based service (LBS). The power supply 1309 is configured to supply power to components in the electronic device 1300.

In some embodiments, the electronic device 1300 further includes one or more sensors 1310. The one or more sensors 1310 include, but are not limited to: an acceleration sensor 1311, a gyroscope sensor 1312, a pressure sensor 1313, a fingerprint sensor 1314, an optical sensor 1315, and a proximity sensor 1316.

A person skilled in the art may understand that the structure shown in FIG. 13 constitutes no limitation on the electronic device 1300, and the electronic device may include more or fewer components than those shown in the figure, or some components may be combined, or a different component deployment may be used.

Some embodiments further provide a non-transitory computer-readable storage medium. The storage medium stores at least one program code therein. The at least one program code is loaded and executed by a processor to implement the method for managing an interface according to any one of the above.

In some embodiments, the computer-readable storage medium may be a read-only memory (ROM), a random access memory (RAM), a compact disc read-only memory (CD-ROM), a magnetic tape, a floppy disk, an optical data storage device, or the like.

Some embodiments further provide a computer program or a computer program product. The computer program or the computer program product stores at least one computer instruction therein. The at least one computer instruction is loaded and executed by a processor to implement the method for managing an interface according to any one of the above.

The sequence numbers of the foregoing embodiments are merely for description purpose and are not limited thereto.

The foregoing embodiments are used for describing, instead of limiting the technical solutions of the disclosure. A person of ordinary skill in the art shall understand that although the disclosure has been described in detail with reference to the foregoing embodiments, modifications can be made to the technical solutions described in the foregoing embodiments, or equivalent replacements can be made to some technical features in the technical solutions, provided that such modifications or replacements do not cause the essence of corresponding technical solutions to depart from the spirit and scope of the technical solutions of the embodiments of the disclosure.

What is claimed is:

1. A method for managing an interface, performed by at least one processor of an electronic device, comprising:
   acquiring a first interface image of a target application;
   determining a first text contained in the first interface image, the first text being a text in a first language corresponding to the target application, and, based on the first interface image and a previous interface image, at least one sub-image of the first interface image, the at least one sub-image being an image region in which the first interface image is different from the previous interface image;

acquiring a second text obtained by translating the first text, the second text being a text in a second language; and replacing the first text in the first interface image with the second text to obtain a second interface image, and displaying, based on the target application, the second interface image.

2. The method according to claim 1, wherein the determining comprises:

acquiring the previous interface image of the first interface image from a plurality of consecutive interface images of the target application; and determining a target text contained in each of the at least one sub-image as the first text.

3. The method according to claim 2, wherein the determining, based on the first interface image and the previous interface image, the at least one sub-image of the first interface image comprises:

determining, based on pixel information of each pixel point in the first interface image and the pixel information of each corresponding pixel point in the previous interface image, a pixel information difference for each of the each pixel point in the first interface image, the pixel information difference being a difference between the pixel information of the each pixel point in the first interface image and the pixel information of the each corresponding pixel point in the previous interface image; and determining, based on the pixel information difference, the at least one sub-image of the first interface image.

4. The method according to claim 3, wherein the pixel information is a grayscale value and the pixel information difference is a difference in the grayscale value; and the determining, based on the pixel information difference, the at least one sub-image of the first interface image comprises:

gathering, based on the difference in the grayscale value of the each of the each pixel points, satisfactory pixel points into at least one cluster, the satisfactory pixel points being pixel points of the each pixel point in the first interface image having the difference in the grayscale value of greater than or equal to a difference threshold; and determining, based on position information of the satisfactory pixel points, each of the at least one sub-image from the first interface image.

5. The method according to claim 2, wherein the determining the target text contained in each of the at least one sub-image as the first text comprises:

determining, for each of the at least one sub-image, a pixel information difference between each of first pixel points in the at least one sub-image and a second pixel point in the at least one sub-image based on pixel information of the each first pixel point and the pixel information of the second pixel point, the second pixel point being a pixel point located at a designated position in the at least one sub-image, and each of the first pixel points being a pixel point in the at least one sub-image other than the second pixel point; and determining, based on the pixel information difference, the first text contained in each of the at least one sub-image.

6. The method according to claim 5, wherein the pixel information is a grayscale value, and the pixel information difference is the difference in the grayscale value; and the determining, based on the pixel information difference, the first text contained in each of the at least one sub-image comprises:

determining a plurality of maxima of the difference in the grayscale value based on the difference in the grayscale value between each of the first pixel points and the second pixel point; and determining, based on each of the first pixel points corresponding to the plurality of maxima, the first text contained in each of the at least one sub-image.

7. The method according to claim 2, wherein the acquiring the second text comprises:

acquiring, for each of the at least one sub-image, the second text corresponding to a stored sub-image stored in a storage region based on the second text corresponding to the at least one sub-image being stored in the storage region; and translating the first text contained in the at least one sub-image to obtain the second text corresponding to the at least one sub-image based on the second text corresponding to the at least one sub-image not being stored in the storage region.

8. The method according to claim 7, wherein after the acquiring the second text, the method further comprises:

storing related information of the first interface image in the storage region, the related information of the first interface image comprising at least one of:

position information of the first text, color information of the first text, size information of the first text, the position information of the second text, the color information of the second text and the size information of the second text.

9. The method according to claim 1, wherein the acquiring the first interface image of the target application comprises:

acquiring, based on a screen reading instruction for a screen of the electronic device, screen data of the electronic device, the electronic device running the target application; and acquiring, based on the screen data, the first interface image.

10. The method according to claim 9, wherein the acquiring, based on the screen data, the first interface image comprises:

generating, based on the screen data not containing status bar data, the first interface image according to the screen data; and filtering out, based on the screen data containing the status bar data, the status bar data from the screen data to obtain interface data, and generating the first interface image based on the interface data.

11. The method according to claim 10, wherein the displaying, based on the target application, the second interface image comprises:

displaying in fullscreen, based on the screen data not containing the status bar data, the second interface image on the screen; and generating, based on the screen data containing the status bar data, a display image to be displayed based on the status bar data and the second interface image, and displaying the display image on the screen.

12. The method according to claim 1, wherein the displaying, based on the target application, the second interface image comprises:

displaying the second interface image above the first interface image, the second interface image completely covering the first interface image.

13. The method according to claim 1, wherein the acquiring the first interface image of the target application comprises:
displaying the first interface image, and displaying a floating window above the first interface image; and
acquiring, based on a trigger operation for the floating window, the first interface image.

14. An apparatus for managing an interface, comprising:
at least one memory configured to store program code; and
at least one processor configured to read the program code and operate as instructed by the program code, the program code comprising:
acquisition code configured to cause the at least one processor to acquire a first interface image of a target application;
determination code configured to cause the at least one processor to determine a first text contained in the first interface image, the first text being a text in a first language corresponding to the target application, and, based on the first interface image and a previous interface image, at least one sub-image of the first interface image, the at least one sub-image being an image region in which the first interface image is different from the previous interface image;
the acquisition code being further configured to cause the at least one processor to acquire a second text obtained by translating the first text, the second text being a text in a second language; and
replacement code configured to cause the at least one processor to replace the first text in the first interface image with the second text to obtain a second interface image, and display, based on the target application, the second interface image.

15. The apparatus according to claim 14, wherein the determination code is further configured to cause the at least one processor to:
acquire the previous interface image of the first interface image from a plurality of consecutive interface images of the target application; and
determine a target text contained in each of the at least one sub-image as the first text.

16. The apparatus according to claim 14, wherein the acquisition code is further configured to cause the at least one processor to acquire, based on a screen reading instruction for a screen of an electronic device, screen data of the electronic device, the electronic device running the target application; and acquire, according to the screen data, the first interface image.

17. The apparatus according to claim 14, wherein the replacement code is further configured to cause the at least one processor to display the second interface image above the first interface image, the second interface image completely covering the first interface image.

18. The apparatus according to claim 14, wherein the acquisition code is further configured to cause the at least one processor to:
display the first interface image, and display a floating window above the first interface image; and
acquire, based on a trigger operation for the floating window, the first interface image.

19. A non-transitory computer-readable storage medium storing computer code that when executed by at least one processor causes the at least one processor to:
acquire a first interface image of a target application;
determine a first text contained in the first interface image, the first text being a text in a first language corresponding to the target application, and, based on the first interface image and a previous interface image, at least one sub-image of the first interface image, the at least one sub-image being an image region in which the first interface image is different from the previous interface image;
acquire a second text obtained by translating the first text, the second text being a text in a second language; and
replace the first text in the first interface image with the second text to obtain a second interface image, and display, based on the target application, the second interface image.

20. The non-transitory computer-readable storage medium according to claim 19, wherein the determine comprises:
acquiring the previous interface image of the first interface image from a plurality of consecutive interface images of the target application; and
determining a target text contained in each of the at least one sub-image as the first text.

\* \* \* \* \*